United States Patent [19]

Leiber

[11] 4,346,944
[45] Aug. 31, 1982

[54] HYDRAULIC MAIN BRAKE CYLINDER

[75] Inventor: Heinz Leiber, Leimen, Fed. Rep. of Germany

[73] Assignee: Robert Bosch GmbH, Stuttgart, Fed. Rep. of Germany

[21] Appl. No.: 146,862

[22] Filed: May 5, 1980

[30] Foreign Application Priority Data

Jun. 23, 1979 [DE] Fed. Rep. of Germany ....... 2925478

[51] Int. Cl.³ .............................................. B60T 8/02
[52] U.S. Cl. .................................... 303/119; 303/116
[58] Field of Search .............................. 303/113–119, 303/61–63, 68–69, 10–11, 111, 6 R, 92, 93; 188/181, 345

[56] References Cited

U.S. PATENT DOCUMENTS

| | | | |
|---|---|---|---|
| 3,549,212 | 12/1970 | Leiber | 303/119 |
| 3,550,966 | 12/1970 | Leiber | 303/119 |
| 3,729,235 | 4/1973 | Bach et al. | 303/114 |
| 3,768,874 | 10/1973 | Riordan | 303/111 |
| 4,025,124 | 5/1977 | Fuchs | 303/119 X |

FOREIGN PATENT DOCUMENTS 2702819  7/1978  Fed. Rep. of Germany .

*Primary Examiner*—Douglas C. Butler
*Attorney, Agent, or Firm*—Edwin E. Greigg

[57] ABSTRACT

A hydraulic main brake cylinder is proposed, in the housing of which at least one part of the switching members of an anti-locking apparatus is integrated. The switching members are either plunger pistons or restoring pistons or a combination of the two, which are triggered by multiple-position valves. In this manner, not only is the structural expense very low, but additional advantages are also attained in terms of safety. The hydraulic main brake cylinder is particularly well suited to application in the brake system of passenger vehicles and lightweight trucks.

7 Claims, 4 Drawing Figures

HYDRAULIC MAIN BRAKE CYLINDER

BACKGROUND OF THE INVENTION

The invention relates to a hydraulic main brake cylinder of the general type described by the preamble to the main claim.

There are several possible ways of combining an anti-locking apparatus of the kind having magnetic valves and switching pistons with a hydraulic main brake cylinder.

First possibility:

A separate hydro-unit for the anti-locking function with an appropriate energy supply, and a conventional brake force amplifier therefor with energy supply effected via underpressure or an underpressure pump. In place of the underpressure amplifier, a hydraulic amplifier can also be used.

Second possibility:

A separate hydro-unit for the anti-locking function and a common energy supply for the hydro-unit, anti-locking means and brake force amplifier. In this case, the brake force amplifier is in the practical sense purely hydraulic.

Third possibility:

In the application of an external-force brake system, it is conceivable for the anti-locking adjustment members for pressure modulation additionally to be housed in the brake valve block.

In the case of auxiliary-force brake systems, the simplest and most elegant possibility of realization is to utilize the main brake cylinder piston for the purpose of anti-locking pressure modulation as well. An apparatus of this kind is known from German laid-open application No. 27 02 819, for instance which corresponds to U.S. application Ser. No. 133,725 which is a continuation of Ser. No. 870,784, abandoned.

Fourth possibility:

Integration of the anti-locking functions in existing main brake cylinders whose function is unchanged. The integration of, for instance, plunger pistons with magnetic valves directly in the main brake cylinder would be conceivable. This realization, however, would be so expensive in terms of costs as well as structural volume that it could not be integrated into existing vehicle concepts.

OBJECT AND SUMMARY OF THE INVENTION

The hydraulic main brake cylinder having a switching piston integrated into the housing of the main cylinder has the advantage over the prior art that it is particularly favorable from the standpoint of structural expense and that it functions very reliably.

In accordance with the characteristics of the dependent claims, the factor of reliability is taken into consideration, in the case of failure of a component, with the use, for instance, of a specialized 3/2-way magnetic valve in the auxiliary circuit of the plunger piston. The combination of a pressure modulator based on the plunger principle with these advantageous valves in the auxiliary circuit is particularly favorable in combination with a pressure modulation apparatus in the second brake circuit functioning in accordance with a different principle. Pressure modulation—for instance, a pressure reduction in this brake circuit—is effected in that the restoring piston, upon being switched into the second position by means of the appropriate actuation of a 3/2-way magnetic valve, is placed under pressure and the corresponding pressure force is exerted upon the main brake cylinder piston, restoring it to its initial position. After the pressure reduction, a throttled pressure buildup occurs (that is, a throttled return flow), which is advantageous from the standpoint of closed-loop control techniques. In accordance with this concept, even when the pressure supply has failed at least one brake circuit is fully capable of functioning.

In a main brake cylinder for conventional brake force distribution, the concept of the invention is advantageously applied for the closed-loop control of ther rear axle. As a result of the functioning of the restoring piston, a feedback of the anti-locking function to the brake pedal occurs, which is well-known to be desirable and is considered advantageous, in order for the driver to be informed that the anti-locking function has been brought into play. Because of the relatively low structural expense (which includes a small volumetric requirement) for the restoring piston and the pressure modulator, it is possible to unite these components spatially with the housing of the main brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
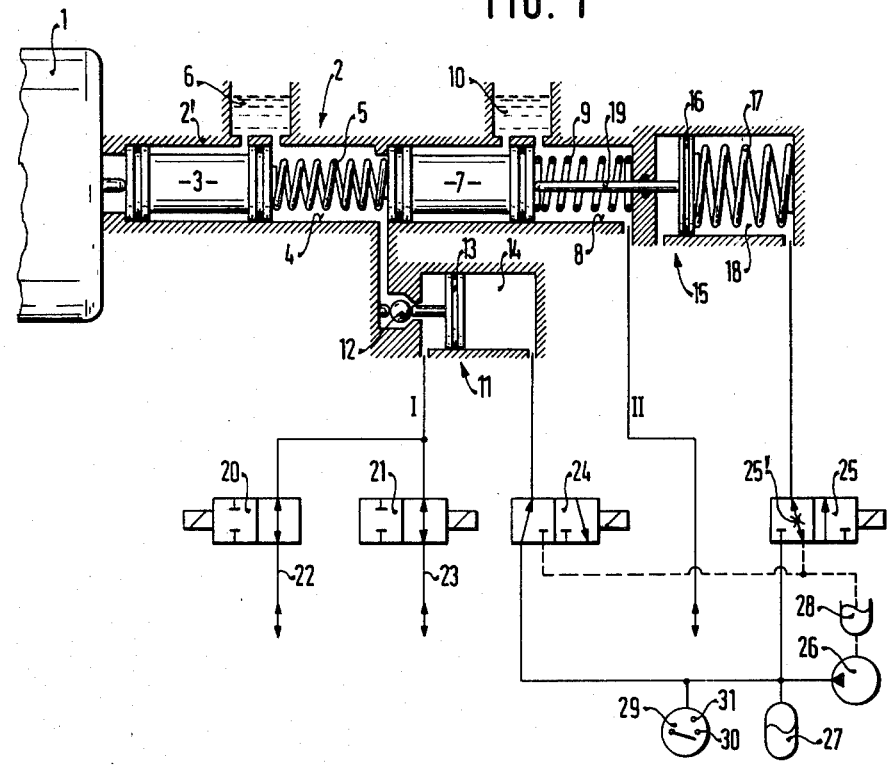
FIG. 1 shows a schematic view of a first embodiment of the invention.

A hydraulic tandem main brake cylinder 2 disposed in a housing 2' is disposed in sequence after a hydraulic brake force amplifier 1. The tandem main brake cylinder 2 is provided with a piston 3, a work cylinder 4, a restoring spring 5 and a refill container 6 for a front-axle brake circuit I and further with a piston 7, a work cylinder 8, a restoring spring 9 and a refill container 10 for a rear-axle brake circuit II.

A plunger piston switching member 11 having a valve 12, plunger piston 13 and work chamber 14 is disposed parallel to the work cylinder 4 and is built into the housing 2' of the main cylinder 2. The plunger piston switching member 11 is used as a pressure modulator for the pressure in brake circuit I, where together with two 2/2- way magnetic valves 20 and 21—one each for each branch brake line 22 and 23, respectively—it embodies an anti-locking apparatus. A 3/2-way magnetic valve 24, with which the pressure in the work chamber 14 can be monitored, is also part of this anti-locking apparatus.

Coaxially behind the work cylinder 8 there is a restoring piston switching member 15 having a piston 16, spring 17, work chamber 18 and piston rod 19. The restoring piston switching member 15 penetrates the work cylinder 8 with the free end of its piston rod 19 and rests on the piston 7. The restoring piston switching member 15 serves the purpose of pressure modulation in the rear-axle brake circuit II. To this end, its work chamber 18 is connected to a 3/2-way magnetic valve 25, which may as needed be provided with a throttle 25' in the return flow portion. The two 3/2-way magnetic valves 24 and 25 communicate both with a pressure source 26/27 made up of a pump 26 and a reservoir 27 and with a pressure-free reservoir 28. The pressuresource 26/27 can be monitored by a pressure switch 29, which has two contact points 30 and 31. The contact 30 pertains to the switching on of the pump 26, and the contact 31 acts to give a warning or serves to shut off the anti-locking apparatus when the pressure is too low.

MODE OF OPERATION

If an adjustment command for pressure reduction is given by an anti-locking electronic system, not shown, for the rear-axle brake circuit II, then the corresponding 3/2-way magnetic valve 25 is brought into its second switching position. Pressure is created in the work chamber 18, which is exerted on the restoring piston 16, and the corresponding pressure force is exerted upon the main brake cylinder piston 7, moving it backward. After pressure reduction, a slow, throttled pressure buildup occurs via the throttle 25', which is desirable for closed-loop control purposes.

If there is an adjustment command for the front axle, the 3/2-way magnetic valve 24 switches over, so that the plunger piston switching member 11 changes from the position of through passage to a closure or relief position for brake circuit I. The brake pressure may be maintained in selective fashion with the aid of the two 2/2-way magnetic valves 20 and 21.

The supply of pressure from the pressure source 26/27 may be embodied particularly simply, because the reservoir 27 needs to have only a small capacity. Its size is dictated essentially by the maximum pressure jump occurring in the corresponding brake circuit I or II. This pressure jump is caused, for instance, when the course of the brake force coefficient abruptly changes, which may happen, for instance, when a vehicle suddenly moves from a dry surface onto ice. Because the associated volume in the brake circuit amounts to only a few cubic centimeters, the reservoir 27 may be correspondingly small in its dimensions, and accordingly low in cost as well.

The pressure supply is monitored by means of the pressure switch 29, which has two switching positions 30 and 31. Switching position 30 is utilized when an electromotor pump drive is used. Upon attainment of the switching position, reservoir charging occurs. The switching position 31 is used for a warning indication and for shutting off the anti-locking function. It is also possible to provide the brake force amplifier 1 with an amplification shutoff device, which can be switched by the pressure switch 29 or by the pressure in brake circuit I.

Figure 2:
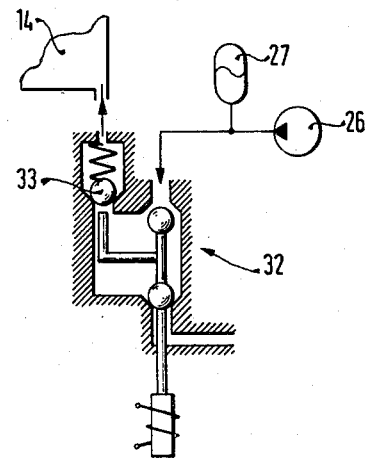
FIG. 2 is a detailed view of a modification of the embodiment shown in FIG. 1.

In place of the 3/2-way magnetic valve 24, a 3/3-way magnetic valve (see FIG. 3a) may be used for safety reasons. However, as FIG. 2 shows, it is also possible to use a specialized 3/2-way magnetic valve 32. This magnetic valve 32 differs from a conventional 3/2-way valve 24 in that a check valve 33 is used in the line to the plunger piston switching member 11 which prevents the evacuation of the work chamber 14 in the event that the pressure supply fails. In order to reduce pressure when the anti-locking function is in force, this check valve 33 is also switched—that is, it is pushed open—when the valve switching motion occurs.

Figures 3, 3A:
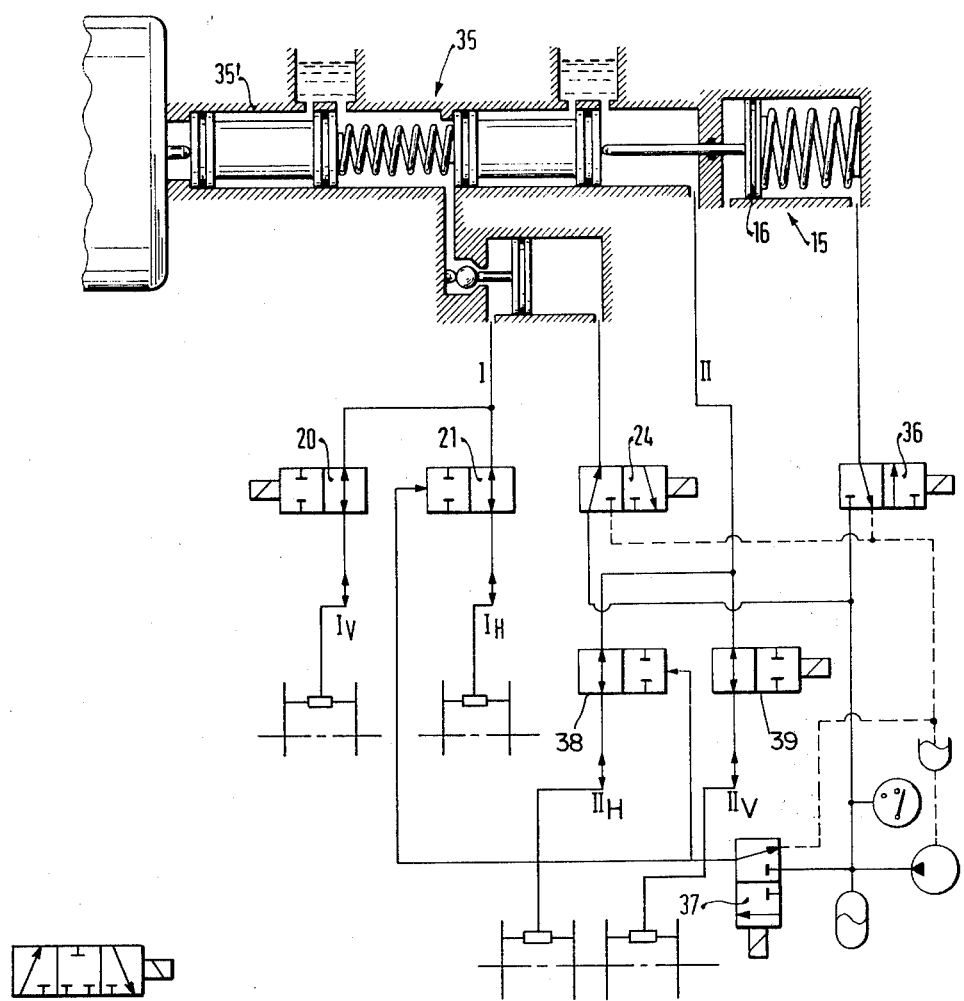
FIG. 3 is a further different embodiment of the antilocking apparatus.
FIG. 3a shows a 3/3-way valve.

FIG. 3 shows the same disposition for a main brake cylinder 35 having a housing 35' but applied in the case of diagonal brake circuit distribution $I_V$, $I_H$, $II_V$, $II_H$ to brake cylinders 40. It is to be understood that V refers to front axle and H to rear axle. The difference is that the magnetic valve 36 for activating the restoring piston of the restoring piston switching member 16, which corresponds to the 3/2-way magnetic valve 25, has no throttle in the return flow line. This is because the magnetic valve of the brake circuit I for the front axle ($I_V$) is clocked for the purpose of furnishing a throttled pressure buildup. If the same closed-loop control concept were applied here as in the example shown in FIG. 1, then a different course of pressure over time at the two front wheels could take place, which would be neither logical nor advantageous. In the state of brake adaptation, chassis adaptation, and closed-loop control concepts prevailing at the present time, rear-axle control by the "select-low" principle has proved reliable; accordingly, in the example of FIG. 3, the anti-locking adjustment members are controlled in anticipatory fashion via a central 3/2-way valve 37, which provides the appropriate pressure from the pressure supply.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A multiple brake system including:
   a hydraulic main cylinder to provide brake pressure having a main piston and a housing,
   a plurality of wheel brake cylinders;
   a brake line for hydraulic connection of the main cylinder and the plurality of wheel brake cylinders; and
   an anti-locking apparatus which includes;
   a first switching member having a plunger piston connected in the brake line to control hydraulic connection of main cylinder and the plurality of wheel brake cylinders such that when the first switching member opens, the brake pressure of the main cylinder is reduced;
   a second switching member having a restoring piston which is connected to the main cylinder to be integral with the housing and mechanically connected to bias the main piston; and
   a plurality of magnetic valves connected to the plurality of wheel brake cylinders to monitor brake pressure 2. A multiple brake system as defined in claim 1, wherein the plurality of wheel brake cylinders comprises a first set of wheel brake cylinders and a second set of wheel brake cylinders, wherein the brake line is connected to the first set of wheel brake cylinders such that the first switching member controls the first set of wheel brake cylinders, and wherein the second switching member is connected to control the second set of wheel brake cylinders.

3. A multiple brake system as defined in claim 2, the anti-locking apparatus also including:
   a pressure source;
   an auxiliary circuit connecting the pressure source to the first switching member, having a 3/2-way magnetic valve which controls connection of the pressure source to the first switching member; and
   two 2/2-way magnetic valves connected to control the first set of wheel brake cylinders.

4. A multiple brake system as defined in claim 3, wherein the 3/2-way magnetic valve comprises in part a check valve.

5. A main brake cylinder as defined by claim 3, further including diagonal brake circuit distribution, characterized in that said 2/2-way magnetic valves are provided with an anticipatory control means comprising a 3/2-way magnetic valve.

6. A multiple brake system as defined in claim 2, the anti-locking apparatus also including:
a pressure source;
an auxiliary circuit connecting the pressure source to the first switching member, having a 3/3-way magnetic valve which controls connection of the pressure source to the first switching member; and
two 2/2-way magnetic valves connected to control the first set of wheel brake cylinders.

7. A multiple brake system as defined in claim 2, the anti-locking apparatus also including:
a pressure source;
an auxiliary circuit connecting the pressure source to the second switching member, having 3/2-way valve with a throttle which controls connection of the pressure source to the second switching member.

* * * * *